No. 715,688. Patented Dec. 9, 1902.
S. H. PICKETT.
STUMP PULLER.
(Application filed Aug. 7, 1902.)
(No Model.)

Witnesses:
F. L. Ourand.
Frank G. Radelfinger.

Inventor:
Samuel H. Pickett,
By Louis Bagger & Co.
Attorneys.

UNITED STATES PATENT OFFICE.

SAMUEL H. PICKETT, OF OSGOOD, INDIANA.

STUMP-PULLER.

SPECIFICATION forming part of Letters Patent No. 715,688, dated December 9, 1902.

Application filed August 7, 1902. Serial No. 118,828. (No model.)

*To all whom it may concern:*

Be it known that I, SAMUEL H. PICKETT, a citizen of the United States, residing at Osgood, in the county of Ripley and State of Indiana, have invented new and useful Improvements in Stump-Pullers, of which the following is a specification.

My invention relates to improvements in stump-pullers; and the object of the same is to construct a device of this character to which power can be connected and which will be simple in construction and efficient in operation.

The novel construction employed by me in carrying out my invention is fully described in this specification and claimed, and illustrated in the accompanying drawings, forming a part thereof, in which—

Figure 1:
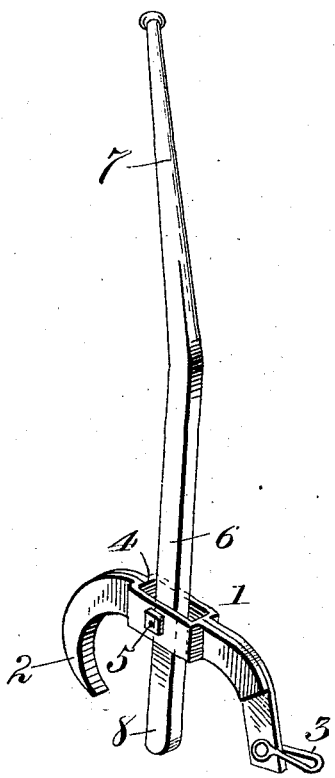
Figure 2:
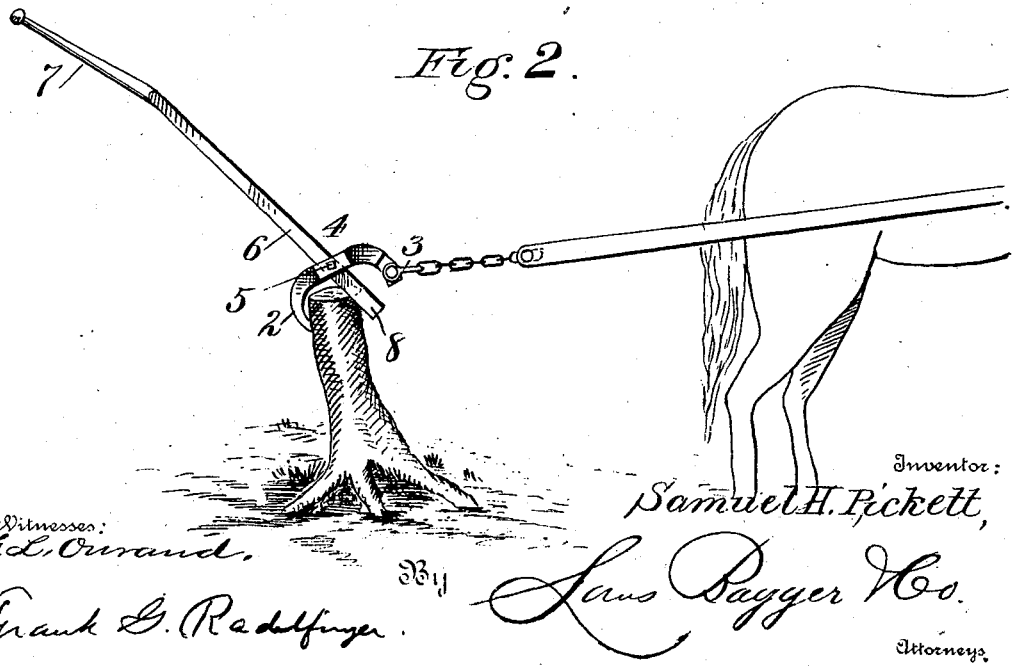

Figure 1 is a perspective of my device. Fig. 2 is a side elevation of the same engaging a stump.

Like numerals of reference designate like parts in the different views of the drawings.

The numeral 1 designates a beam bearing a claw 2, formed integral therewith. A clevis 3 is connected to the end of the beam and serves to hitch a team of horses for operating the device. An aperture 4 is formed in the beam 1, and extending through said aperture and fulcrumed on a cross-pin 5 is a setting-lever 6. The lever 6 has a long arm 7, arranged to be grasped by the driver to set and hold the device, and a short arm 8, located to coöperate with the claw 2 to grip the stump or root to be pulled out.

In operation a team or other source of power is hitched to the clevis 3 and the device brought into position. The claw 2 is then set to engage the rear of the stump, the arm 7 grasped, and the claw forced into the body of the stump. The team is then started and the stump withdrawn, while the driver retains his hold on the arm 7 of the lever 6.

I do not wish to be limited as to the details of construction, as these may be modified in many particulars without departing from the spirit of my invention.

Having thus described my invention, what I claim as new, and desire to secure by Letters Patent, is—

1. In a stump-puller the combination of a beam bearing a claw on one end and having its other end curved in the same direction as said claw, a setting-lever fulcrumed on said beam and having its short arm located to coöperate with said claw to grip a stump, and means for hitching horses to the curved end of said beam, substantially as described.

2. In a stump-puller, the combination of a beam bearing a claw, means for hitching horses to said beam, and a lever fulcrumed on said beam and arranged to coöperate with said claw, substantially as described.

3. In a stump-puller the combination of a curved beam bearing a claw, means for connecting power to said beam, and a lever fulcrumed on said beam and arranged to coöperate with said claw, substantially as described.

In testimony whereof I have hereunto set my hand in presence of two subscribing witnesses.

SAMUEL H. PICKETT.

Witnesses:
SAMUEL COX,
EDWARD E. STUTIE.